(12) United States Patent
Tang et al.

(10) Patent No.: US 10,582,103 B2
(45) Date of Patent: Mar. 3, 2020

(54) CAMERA MODULE APPLIED TO TERMINAL AND TERMINAL INCLUDING SAME

(71) Applicant: GUANGDONG OPPO MOBILE TELECOMMUNICATIONS CORP., LTD., Dongguan, Guangdong (CN)

(72) Inventors: Yimei Tang, Dongguan (CN); Yi Sun, Dongguan (CN); Haijin Hu, Dongguan (CN); Xinquan Zhou, Dongguan (CN); Jingming Wan, Dongguan (CN); Guangwei Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/804,474

(22) Filed: Nov. 6, 2017

(65) Prior Publication Data

US 2018/0198966 A1 Jul. 12, 2018

(30) Foreign Application Priority Data

Jan. 11, 2017 (CN) .......................... 2017 1 0021518

(51) Int. Cl.
*H04N 5/225* (2006.01)
(52) U.S. Cl.
CPC ......... *H04N 5/2257* (2013.01); *H04N 5/2252* (2013.01); *H04N 5/2258* (2013.01)

(58) Field of Classification Search
CPC .. H04N 5/2252; H04N 5/2253; H04N 5/2254; H04N 5/2257; H04N 5/2258; H05K 1/14; H05K 1/028; H05K 1/189
See application file for complete search history.

(56) References Cited

U.S. PATENT DOCUMENTS

| | | | |
|---|---|---|---|
| 2012/0086784 A1 | 4/2012 | Oh et al. | |
| 2014/0078708 A1* | 3/2014 | Song | H04M 1/0264 361/809 |
| 2014/0212127 A1* | 7/2014 | Chen | H04N 5/2257 396/542 |
| 2016/0227193 A1 | 8/2016 | Osterwood et al. | |
| 2017/0195533 A1* | 7/2017 | Seo | H04N 5/23238 |
| 2018/0054554 A1* | 2/2018 | Xie | H04N 5/2253 |
| 2018/0167540 A1* | 6/2018 | Liu | H04N 5/2253 |
| 2018/0176435 A1* | 6/2018 | Wei | H04N 5/2258 |

FOREIGN PATENT DOCUMENTS

| | | |
|---|---|---|
| CN | 204517922 U | 7/2015 |
| CN | 204559665 U | 8/2015 |
| CN | 204633900 U | 9/2015 |

(Continued)

*Primary Examiner* — Kelly L Jerabek
(74) *Attorney, Agent, or Firm* — Ladas & Parry, LLP (57) ABSTRACT

A camera module includes a first camera module, a first flexible printed circuit, a second camera module, and a second flexible printed circuit. The first flexible printed circuit is connected to the first camera module. The second camera module is arranged side by side with the first camera module. The second flexible printed circuit is connected to the second camera module. At least one of the first flexible printed circuit and the second flexible printed circuit extends along an arrangement direction of the first camera module and the second camera module.

20 Claims, 8 Drawing Sheets

(56) References Cited

FOREIGN PATENT DOCUMENTS

| | | |
|---|---|---|
| CN | 204667028 U | 9/2015 |
| CN | 205545576 U | 8/2016 |
| CN | 205545608 U | 8/2016 |
| CN | 105933581 A | 9/2016 |
| CN | 106164732 A | 11/2016 |
| CN | 106791330 A | 5/2017 |
| JP | 2009265412 A | 11/2009 |
| KR | 100649770 B1 | 11/2006 |

* cited by examiner

CAMERA MODULE APPLIED TO TERMINAL AND TERMINAL INCLUDING SAME

CROSS REFERENCE TO RELATED APPLICATIONS

This application claims priority to Chinese Application No. 201710021518.7 filed Jan. 11, 2017. The entire disclosure of the above application is incorporated herein by reference in its entirety.

BACKGROUND

Field

The present disclosure relates to the field of terminals, and particularly to a camera module applied to a terminal, and a terminal including same.

Background

With the rapid development of terminals, terminals are becoming more and more popular. Terminals have become indispensable equipments in people's lives. People can study and be entertained through the terminals.

Picture taking is one of the most common functions in the terminals. In order to achieve better picture taking capabilities, more and more terminal manufacturers begin to use a dual camera scheme. Compared to a single camera, dual cameras can take pictures having almost double resolution using an algorithm synthesis. In the actual picture taking process, dual cameras can capture more picture detail.

Because the camera module of the terminal includes an additional camera as well as an additional flexible printed circuit (FPC) for the additional camera, a running of the FPCs of the camera module occupies a larger space of a circuit board. Therefore, the layout of the circuit board of the terminal is difficult.

BRIEF DESCRIPTION OF THE DRAWINGS

In order to more clearly illustrate the embodiments of the present disclosure or related art, the following figures described in the embodiments are briefly introduced. It is obvious that the drawings are merely some embodiments of the present disclosure, a person skilled in the art can obtain other figures according to these figures under the premise that the person does not pay laborious endeavor.

DETAILED DESCRIPTION OF ILLUSTRATED EMBODIMENTS

In combination with the drawings of the embodiments of the present disclosure, the following is related to a detailed and complete description of the technology of the embodiments of the present disclosure. It is obvious that the disclosed embodiments are only a part of the embodiments available to the present disclosure, rather than the all embodiments thereof. Based on the disclosed embodiments of the present disclosure, other embodiments obtained by a person skilled in the art without endeavor of creativity belong to the protected scope of the present embodiments of the present disclosure.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counter-clockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, unless specified or limited otherwise, it should be noted that, terms "mounted," "connected," "coupled," and "fastened," etc. may be understood broadly, such as permanent connection or detachable connection, mechanical connection or electronic connection, direct connection or indirect connection via intermediary, inner communication or interreaction between two elements. A person skilled in the art should understand the specific meanings in the present disclosure according to specific situations.

In the description of the present disclosure, unless specified or limited otherwise, it should be noted that, a structure in which a first feature is "on" a second feature may include an embodiment in which the first feature directly contacts the second feature, and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation less than the sea level elevation of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, a person skilled in the art may be aware of applications of other processes and/or other materials.

An embodiment of the present disclosure provides a camera module and a terminal, which are described in detail below.

Figure 1:
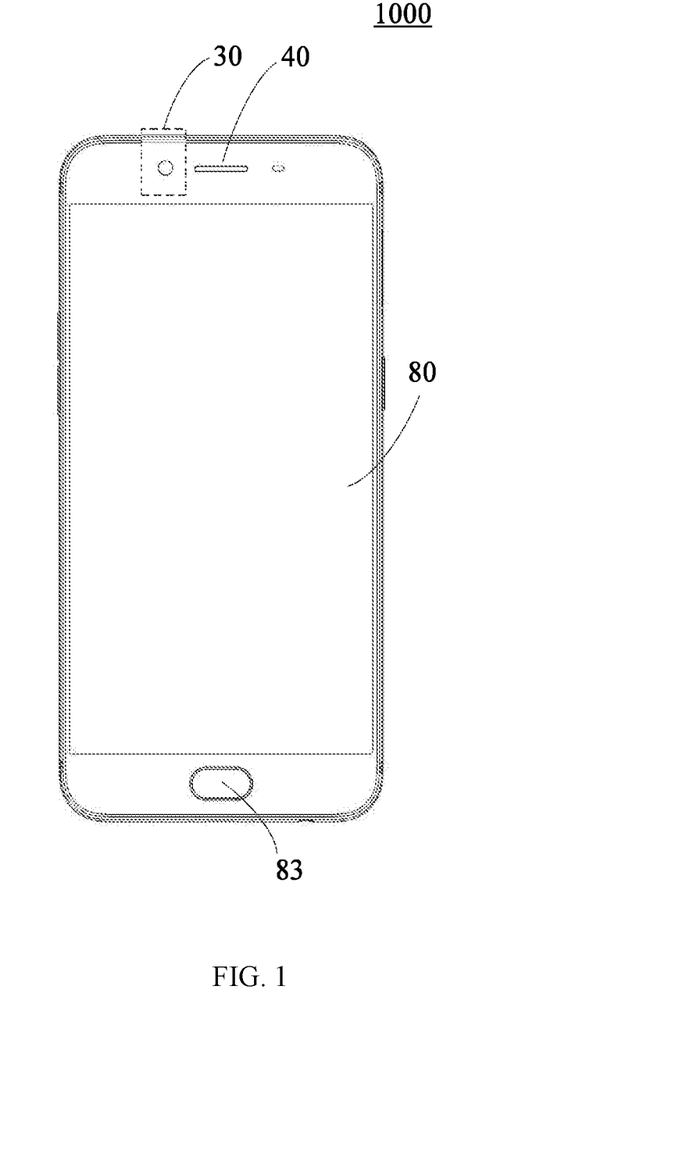
FIG. 1 is a front view of a terminal according to an embodiment of the present disclosure.
Figure 2:
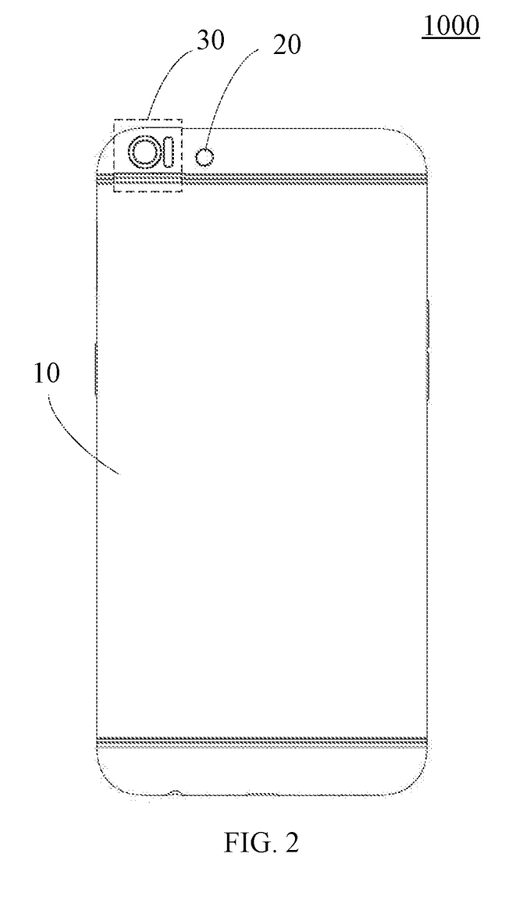
FIG. 2 is a rear view of the terminal of FIG. 1.
Figure 3:
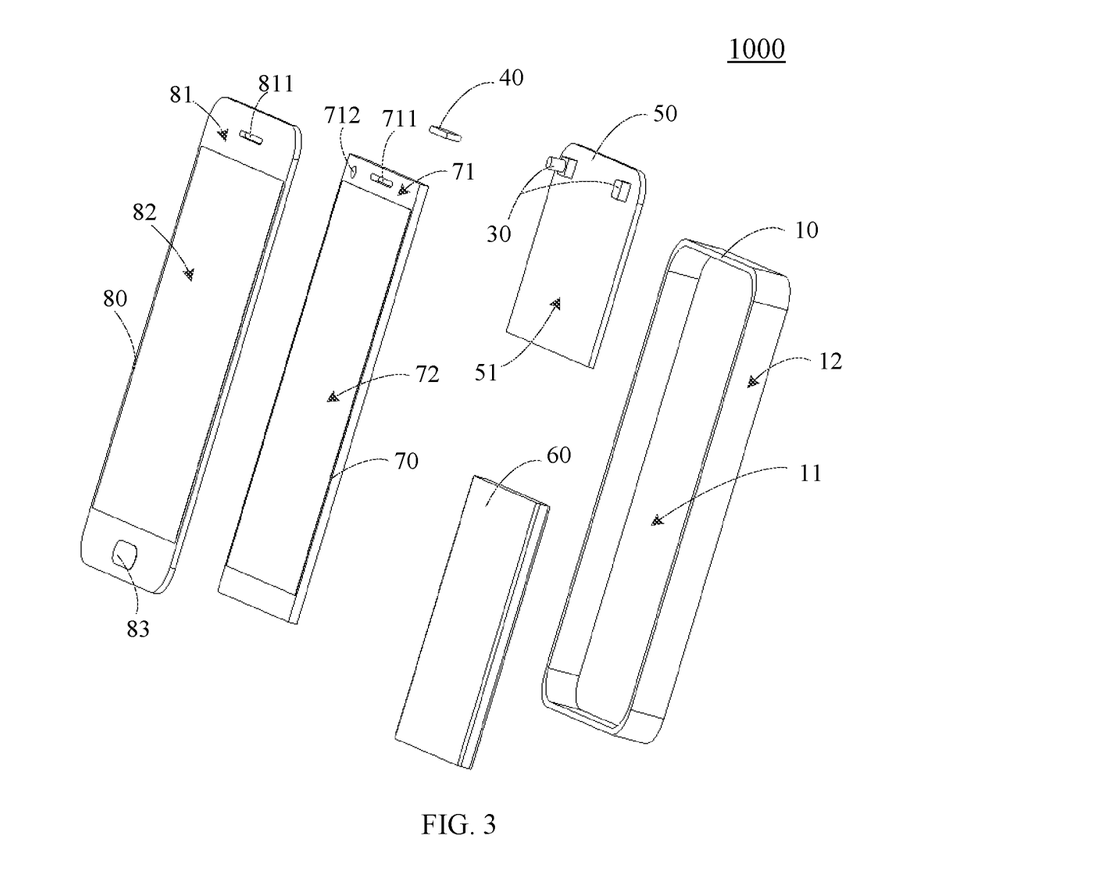
FIG. 3 is an exploded view of the terminal of FIG. 1.

Referring to FIG. 1 to FIG. 3, a terminal 1000 in accordance with an embodiment of the present disclosure includes a rear cover 10, a light emitting diode (LED) lamp 20, a camera module 30, a receiver 40, a circuit board 50, a battery 60, a display screen 70, and a cover plate 80.

The rear cover 10 includes a body 11 and a side wall 12 disposed on a periphery of the body 11. The periphery of the body 11 of the rear cover 10 includes a first camera hole, a second camera hole, and a LED lamp hole for a camera to take picture. The LED lamp 20 can be used for instantaneous illumination when the camera module 30 captures an image in the case of dark ambient light, and the LED lamp 20 also provides a local lighting for an object to be photographed in the case where the ambient light is bright.

The camera module 30 is configured to capture an external image. The camera module 30 includes a rear camera module and a front camera module. A position of the rear camera module corresponds to positions of the first camera hole and the second camera hole. In some embodiments, the front camera module can be removed, at such situation the rear camera module constructs the camera module 30.

The circuit board 50 which may be a motherboard includes a control circuit 51. The LED lamp 20, the camera module 30, and the receiver 40 are disposed on the circuit board 50.

The battery 60 is mounted in the rear cover 10 and is electrically connected to the circuit board 50 to provide power to the circuit board 50.

The display screen 70 includes a non-display area 71 and a display area 72. A top of the non-display area 71 includes an opening 711 and a front camera hole 712. The opening 711 is used for the receiver 40 to emit sound. The front camera hole 712 is used for the front camera module to take picture. In some embodiments, the front camera hole 712 may be omitted, or removed. A printed ink layer is disposed on a lower surface of a transparent glass corresponding to the non-display area 71 except the opening 711 and the front camera hole 712 for shielding an internal structure of the terminal 1000. The display screen 70 may be made of material such as glass, ceramic, or sapphire, etc.

The cover plate 80 is mounted on the display screen 70 and includes a non-display area 81 and a display area 82. The display area 82 of the cover plate 80 may be used for displaying an image and/or for a user to perform touch manipulation, etc. A top of the display area 81 includes an opening 811 for the receiver 40 to emit the sound. The receiver 40 is disposed corresponds to a position of the opening 811. A fingerprint identification module 83 is disposed on a bottom of the non-display area 81. The fingerprint identification module 83 may be used to acquire fingerprint information of the user.

The control circuit 51 may be electrically connected with the LED lamp 20, the camera module 30, the receiver 40, and the fingerprint identification module 83 to control the entire terminal 1000.

Figure 4:
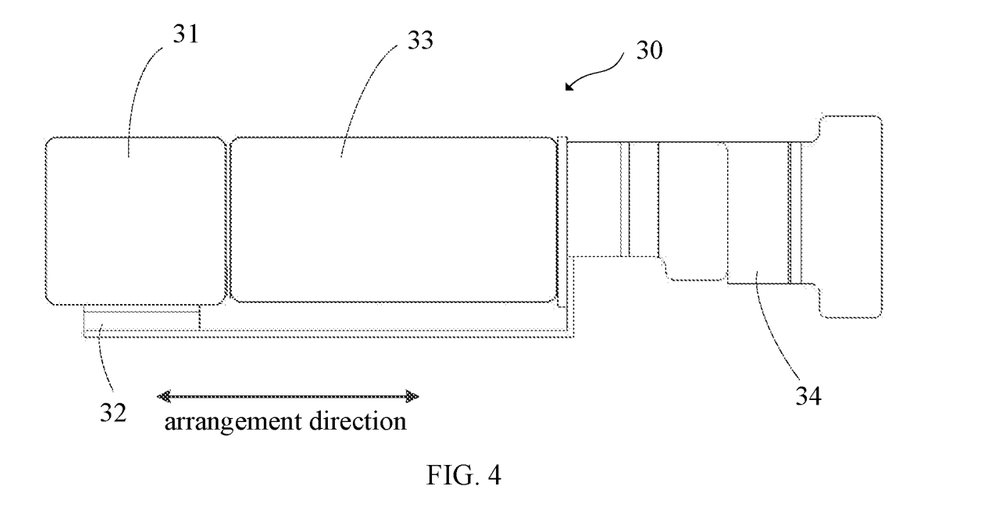
FIG. 4 is a schematic view of a first structure of a camera module according to an embodiment of the present disclosure.

Referring to FIG. 4, in the embodiment, the camera module 30 includes a first camera module 31, a first flexible printed circuit 32, a second camera module 33, and a second flexible printed circuit 34. The first flexible printed circuit 32 is connected to the first camera module 31. The second camera module 33 is arranged side by side with the first camera module 31. The second flexible printed circuit 34 is connected to the second camera module 33. At least one of the first flexible printed circuit 32 and the second flexible printed circuit 34 extends along an arrangement direction of the first camera module 31 and the second camera module 33 to electrically connect to the circuit board 50.

Figure 5:
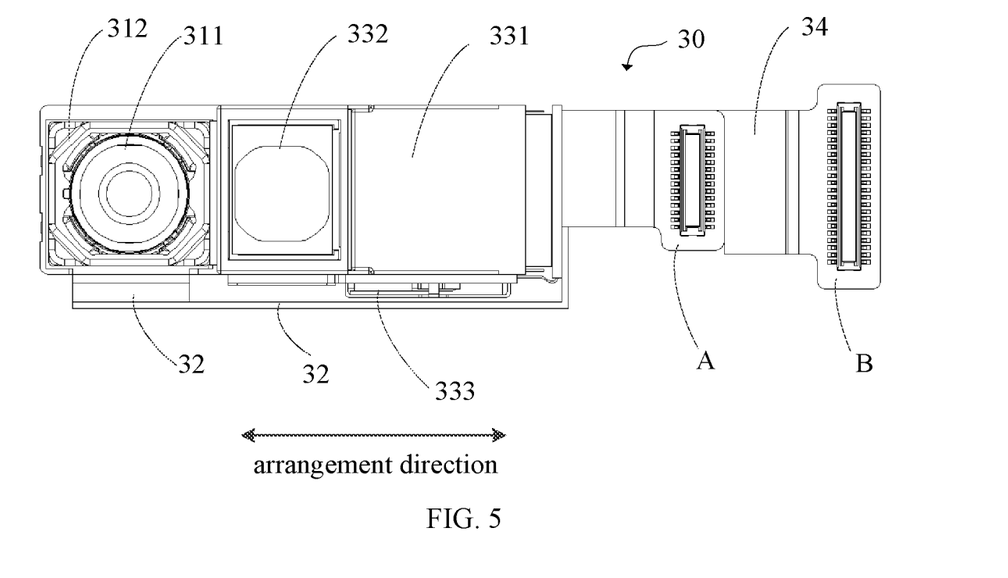
FIG. 5 is a schematic view of a second structure of a camera module according to an embodiment of the present disclosure.

Referring to FIG. 5, in some embodiments, the first camera module 31 includes a first camera 311 and a base 312 supporting the first camera 311. The first flexible circuit board 32 is electrically connected with the first camera 311. A lens of the first camera 311 faces the rear cover 11 of the terminal 1000. The first camera 311 is used for photographing an image behind the terminal 1000. It is to be understood that the base 312 can be made of plastic.

In some embodiments, the second camera module 33 includes a second camera 331, a light guide component 332, and a frame 333. The frame 333 accommodates and fixes the second camera 331 and the light guide component 332. The second camera 331 is arranged side by side with the light guide component 332. The second camera 331 is electrically connected with the second flexible printed circuit 34.

It is to be understood that the frame 333 can be made of metallic material. In the embodiment, the light guide component 332 is a prism.

A light exit surface of the light guide component 332 faces the rear cover 11 of the terminal 1000, and a lens of the second camera 331 faces the light guide component 332. External light is transmitted to the second camera 331 by the light guide component 332 so that the second camera 331 takes a picture behind the terminal 1000.

Referring to FIG. 5, in some embodiments, the camera module 30 further includes a first connector A (such as board to board, BTB) and a second connector B. The first flexible printed circuit 32 is fastened to the circuit board 50 by the first connector A to realize electrical connection with the circuit board 50. The second flexible printed circuit 34 is fastened to the circuit board 50 by the second connector B to realize electrical connection with the circuit board 50.

It is to be understood that the flexible printed circuit can be arranged in the following ways.

(1) Only the first flexible printed circuit 32 extends along the arrangement direction of the first camera module 31 and the second camera module 33.

(2) Only the second flexible printed circuit 34 extends along the arrangement direction of the first camera module 31 and the second camera module 33.

(3) The first flexible printed circuit 32 and the second flexible printed circuit 34 extend along the arrangement direction of the first camera module 31 and the second camera module 33.

In some embodiments, the first flexible printed circuit 32 extends from a side wall of the first camera module 31 parallel to the arrangement direction, and twists to be adjacent to a side wall of the second camera module 33, and extends along the side wall of the second camera module 33 to exceed an end of the second camera module 33 away from the first camera module 31 to electrically connect to the circuit board 50.

Because of physical properties of the flexible printed circuit, the flexible printed circuit has a high wiring density, light weight, and thin thickness. The flexible printed circuit can be bent, folded, wound, twisted, and stretched in three-dimensional space to realize light weight, miniaturization, and thin thickness so as to achieve integration of component and wire connection. Therefore, when the first flexible printed circuit 32 extends from the first camera module 31, the first flexible printed circuit 32 can be twisted to be adjacent to the side wall of the first camera module 31. The first flexible printed circuit 32 extends along the side wall of the second camera module 33 to exceed the end of the second camera module 33 away from the first camera module 31. The first flexible printed circuit 32 can be twisted again so as to be adjacent to an end of the second camera module 33 adjacent to the side wall of the second camera module 33. The first flexible printed circuit 32 is fastened to the circuit board 50 by the first connector A to realize electrical connection with the circuit board 50.

In practical application, in order to facilitate twisting, a shape of the first flexible printed circuit 32 can be an L shape.

In some embodiments, the second flexible printed circuit 34 extends from a side wall of the second camera module 33 parallel to the arrangement direction, the second flexible printed circuit 34 is adjacent to a side wall of the first camera module 31, and the second flexible printed circuit 34 extends exceed an end of the first camera module 31 away from the second camera module 33 to electrically connect to the circuit board 50.

Similarly, the second flexible printed circuit 34 extends from the second camera module 33 and can be twisted to be adjacent to a side wall of the second camera module 33. The second flexible printed circuit 34 extends along the side wall of the first camera module 31 to exceed an end of the first camera module 31 away from the second camera module 33. The second flexible printed circuit 34 can be twisted again so as to be adjacent to an end of the first camera module 31 adjacent to the side wall of the first camera module 31. The second flexible printed circuit 34 is fastened to the circuit board 50 by the second connector B to realize electrical connection with the circuit board 50.

In practical application, in order to facilitate twisting, a shape of the second flexible printed circuit 34 can be an L shape.

In some embodiments, the first flexible printed circuit 32 extends from an end of the first camera module 31 being perpendicular to the arrangement direction and away from the second camera module 33 to realize electrical connection with the circuit board 50.

In some embodiments, the positions of the first camera module 31 and the second camera module 33 may be exchanged.

It is to be understood that in such situation the first flexible printed circuit 32 and the second flexible printed circuit 34 can be arranged in the following ways.

Figure 6:
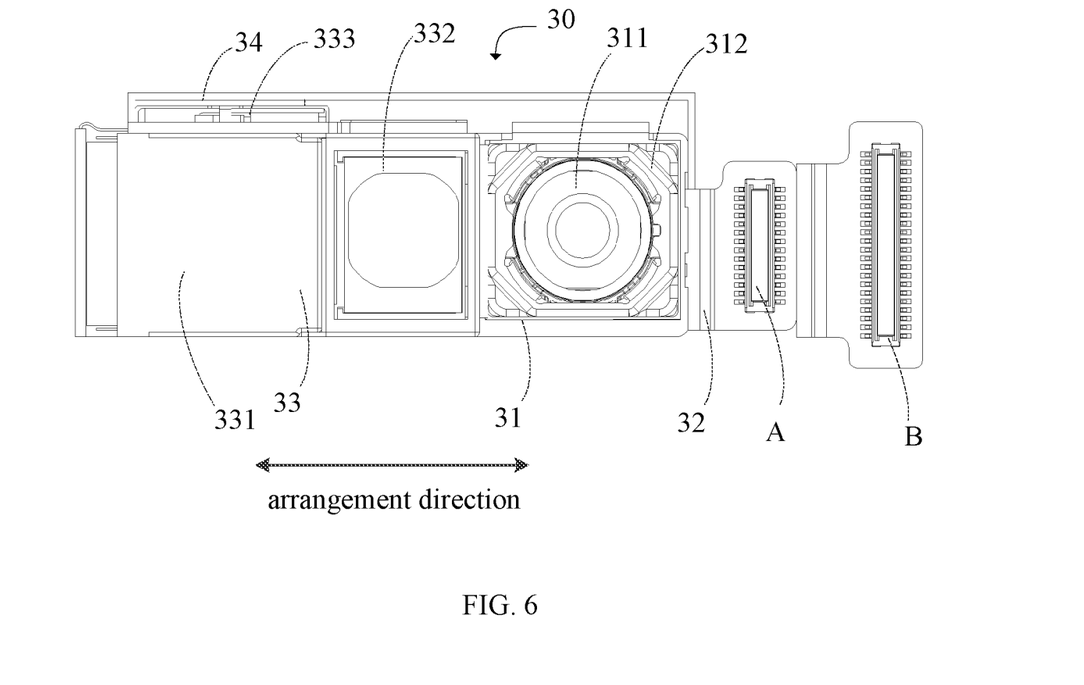
FIG. 6 is a schematic view of a third structure of a camera module according to an embodiment of the present disclosure.

(1) Referring to FIG. 6, the first flexible printed circuit 32 extends from an end of the first camera module 31 and is parallel to the arrangement direction to realize electrical connection with the circuit board via the connector A. The second flexible printed circuit 34 extends from a side wall of the second camera module 33 parallel to the arrangement direction, and is twisted to be parallel to the arrangement direction, and further extends alongside walls of the second camera module 33 and the first camera module 31 from the second camera module 33 to exceed the end of the first camera module 31 away from the second camera module 33, and realizes electrical connection with the circuit board 50 via the connector B.

Figure 7:
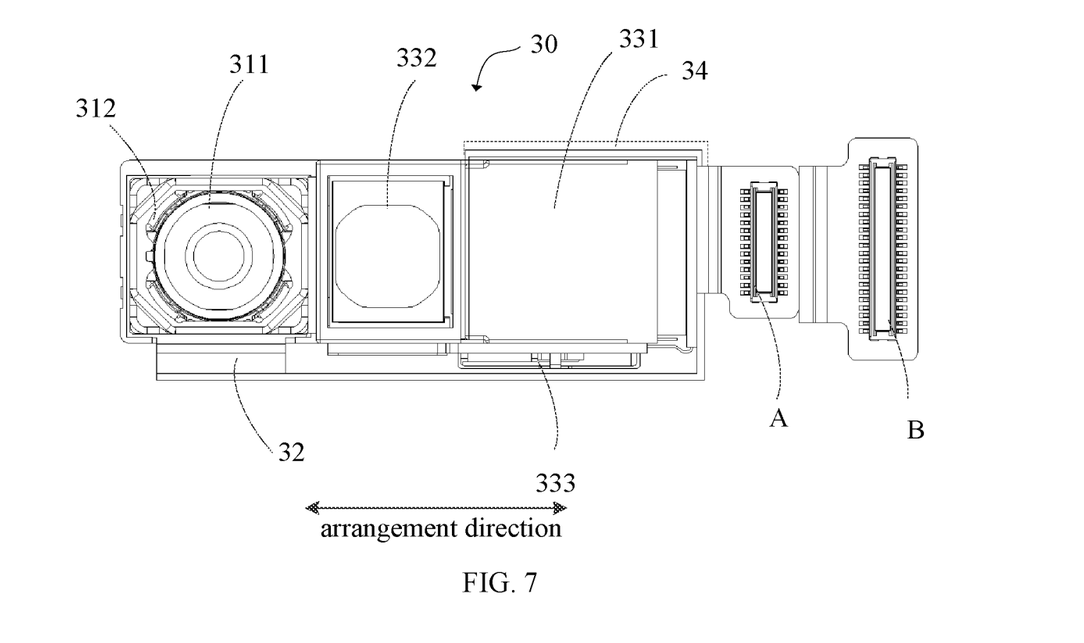
FIG. 7 is a schematic view of a fourth structure of a camera module according to an embodiment of the present disclosure.

(2) Referring to FIG. 7, the first flexible printed circuit 32 extends from a side wall of the first camera module 31 parallel to the arrangement direction, and is twisted to be parallel to the arrangement direction, and is adjacent to side walls of the first camera module 31 and the second camera module 33, and further extends to exceed an end of the second camera module 33 away from the first camera module 31, and realizes electrical connection with the circuit board 50 via the connector A. The second flexible printed circuit 34 extends from a side wall of the second camera module 33 parallel to the arrangement direction to realize electrical connection with the circuit board 50 via the connector B, the second flexible printed circuit 34 is twisted to be adjacent to the side wall of the second camera module 33. The first flexible printed circuit 32 and the second flexible printed circuit 34 extend in parallel along a same direction.

Figure 8:
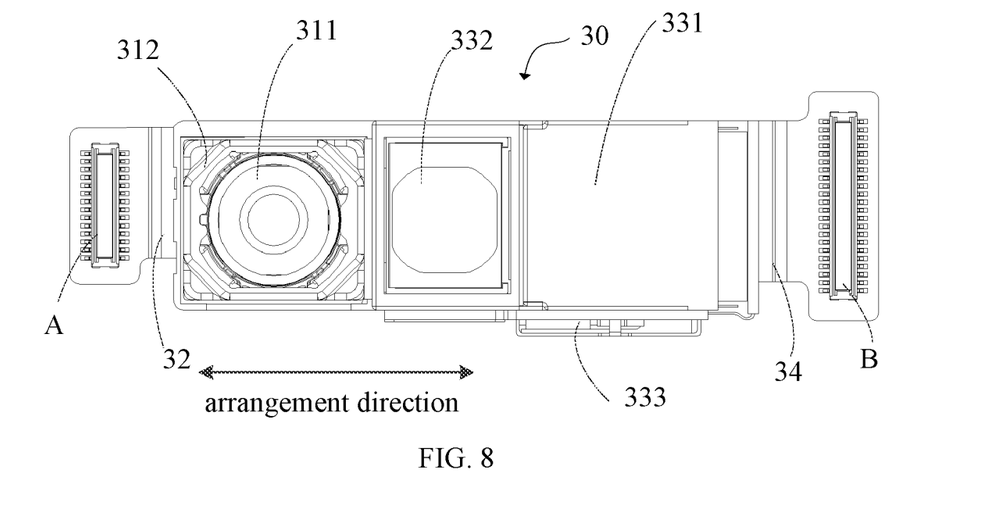
FIG. 8 is a schematic view of a fifth structure of a camera module according to an embodiment of the present disclosure.

(3) Referring to FIG. 8, the first flexible printed circuit 32 extends from a side wall of the first camera module 31 and is parallel to the arrangement direction to electrically connect to the circuit board 50 via the connector A. The second flexible printed circuit 34 extends from a side wall of the second camera module 33 and is parallel to the arrangement direction to electrically connect to the circuit board 50 via the connector B. The first flexible printed circuit 32 and the second flexible printed circuit 34 extend in parallel along opposite directions.

Figure 9:
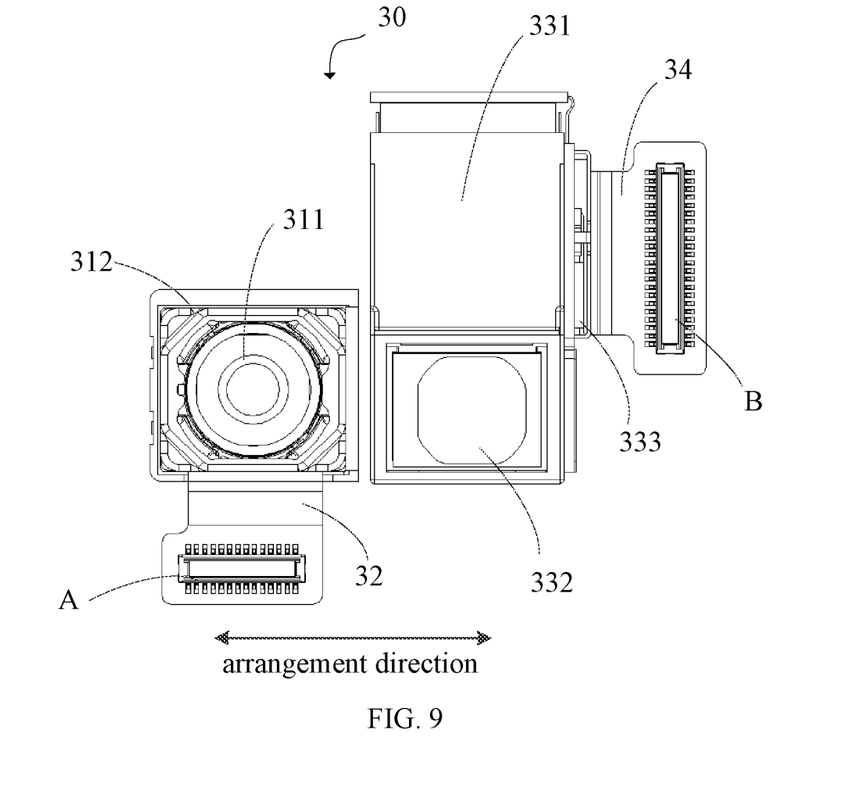
FIG. 9 is a schematic view of a six structure of a camera module according to an embodiment of the present disclosure.

(4) Referring to FIG. 9, the first flexible printed circuit 32 extends from a side wall of the first camera module 31 away from the second camera module 33 and is perpendicular to the arrangement direction to realize electrical connection with the circuit board 50 via the connector A. The second flexible printed circuit 34 extends from a side wall of the second camera module 33 away from the first camera module 31 and is parallel to the arrangement direction to realize electrical connection with the circuit board 50 via the connector B. The first flexible printed circuit 32 and the second flexible printed circuit 34 may extend perpendicularly to each other.

In some embodiments, the terminal 1000 may further include a third flexible printed circuit 35 connected to the light guide component 332.

In an embodiment, the camera module may further include a third connector C. The third flexible printed circuit 35 is electrically connected with the circuit board 50 via the third connector C.

In some embodiments, the third flexible printed circuit 35 extends from a side wall of the light guide component 332 parallel to the arrangement direction, is adjacent to a side wall of the second camera 331, and further extends to exceed an end of the second camera module 33 away from the first camera module 31 to electrically connect to the circuit board 50.

In some embodiments, the third flexible printed circuit 35 extends from an end of the light guide component 332 being perpendicular to the arrangement direction and away from the first camera module 31 to realize electrical connection with the circuit board 50.

It is to be understood that the first flexible printed circuit 32, the second flexible printed circuit 34, and the third flexible printed circuit 35 can be arranged in the following ways.

Figure 10:
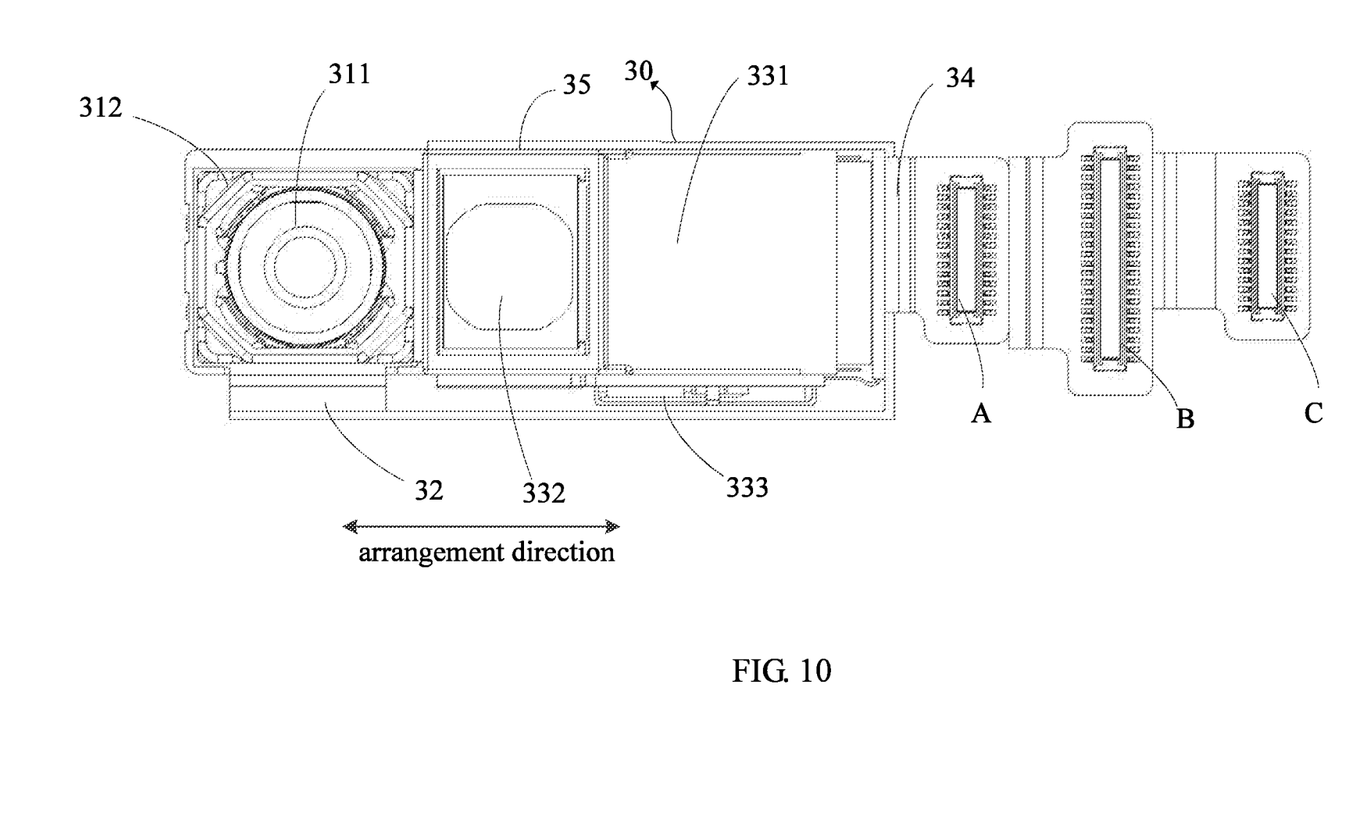
FIG. 10 is a schematic view of a seven structure of a camera module according to an embodiment of the present disclosure.

(1) Referring to FIG. 10, the first flexible printed circuit 32 extends from a side wall of the first camera module 31 parallel to the arrangement direction, and is twisted to be parallel to the arrangement direction and adjacent to side walls of the first camera module 31 and the second camera module 33 and further extends to exceed an end of the second camera module 33 away from the first camera module 31 to realize electrical connection with the circuit board 50 via the connector A. The second flexible printed circuit 34 extends from a side wall of the second camera module 33 parallel to the arrangement direction to realize electrical connection with the circuit board 50 via the connector B. The third flexible printed circuit 35 is twisted to be parallel to the arrangement direction, is adjacent to side walls of the light guide component 332 and the second camera module 33, and further extends to exceed an end of the second camera module 33 away from the first camera module 31 to realize electrical connection with the circuit board 50 via the connector C.

Figure 11:
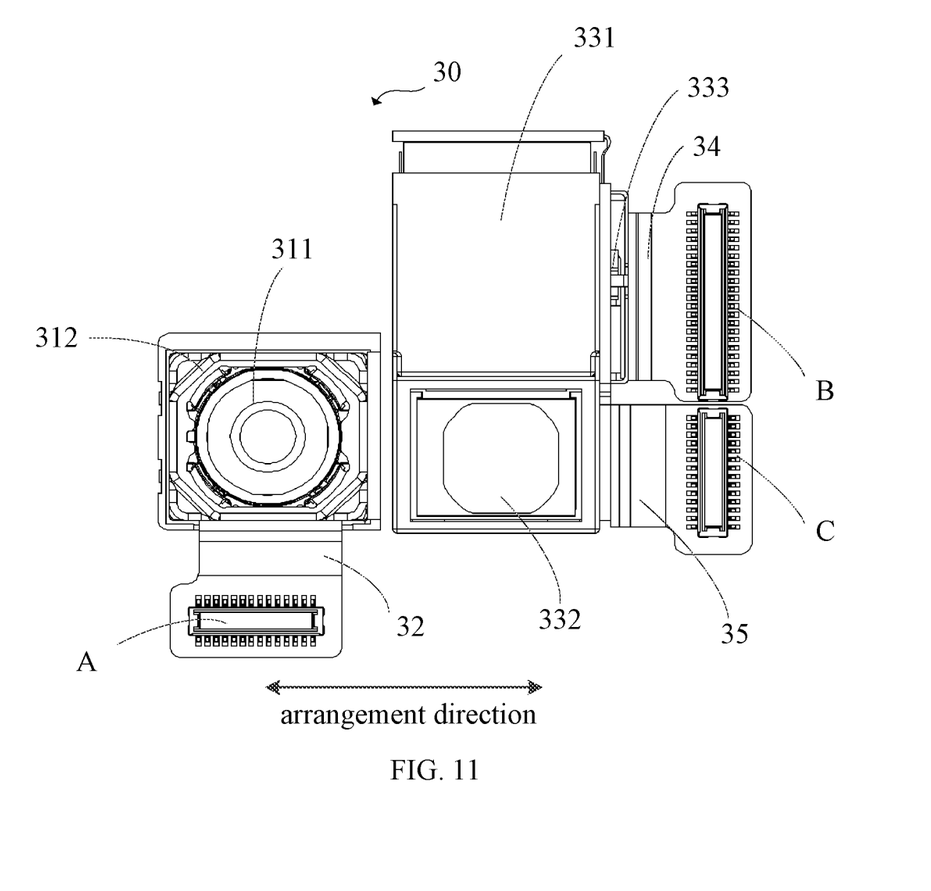
FIG. 11 is a schematic view of an eight structure of a camera module according to an embodiment of the present disclosure.

(2) Referring to FIG. 11, the first flexible printed circuit 32 extends from a side wall of the first camera module 31 away from the second camera module 33 and is perpendicular to the arrangement direction to realize electrical connection with the circuit board 50 via the connector A. The second flexible printed circuit 34 extends from a side wall of the second camera module 33 away from the first camera module 31 and is parallel to the arrangement direction to realize electrical connection with the circuit board 50 via the connector B. The third flexible printed circuit 35 extends from a side wall of the light guide component 332 away from the first camera module 31 and is parallel to the arrangement direction to realize electrical connection with the circuit board 50 via the connector C.

In addition, the first flexible printed circuit 32, the second flexible printed circuit 34, and the third flexible printed circuit 35 are arranged in other combinations, and are not exemplified here.

In some embodiments, a length of the first camera 311 is less than a length of the second camera 331. The length of the second camera 331 is greater than the length of the first camera 311, in order to reduce an overall thickness of the camera module 30 and keep a thickness of the terminal 1000 unchanged. The first camera module 31 and the second camera module 33 are arranged side by side when assembling the first camera module 31 and the second camera module 33. The detail arrangement is as follows.

The first camera 311, the second camera 331, and the light guide component 332 are arranged side by side to form a "linear" shape. A light exit surface of the second camera 331 faces the first camera module 31 (that is, a light exit surface of the second camera 331 faces the first camera 311). A light exit surface of the light guide component 332 and a light exit surface of the first camera module 31 are arranged in parallel. The light guide component 332 is disposed between the first camera module 31 and the second camera 331. A base 312 of the first camera module 31 abuts against the second camera module 33. For example, the base 312 of the first camera module 31 and the frame 333 of the second camera module 33 are jointed at the bottom of the terminal by glue.

In the embodiment of the present disclosure, a working principle of the camera module is as follows.

The first camera module 31 is used at the time of taking a picture. The first camera module 31 is a wide-angle lens. The lens of the first camera module 31 captures a scene behind the terminal 1000, generates an optical image, projects the optical image onto a surface of an image sensor, converts the optical image into an electrical signal, converts the electrical signal into a digital image signal after analog-to-digital conversion, and transmits the digital image signal to a digital signal processing chip for processing to obtain a first image. The second camera module 33 is used at the time of taking a picture. The second camera module 33 is a long-focus lens. External light is transmitted into the second camera 331 by the light guide component 332. The lens of the second camera module 33 captures a scene behind the terminal 1000, generates an optical image, projects the optical image onto a surface of an image sensor, converts the optical image into an electrical signal, converts the electrical signal into a digital image signal after analog-to-digital conversion, and transmits the digital image signal to a digital signal processing chip for processing to obtain a second image. The first image and the second image are combined to obtain a final image.

In some embodiments, the first camera and the second camera may also be dislocated, as follows.

The first camera 311 and the second camera 331 are dislocated to form an "L" shape. The first camera module 31 and the light guide component 332 are arranged side by side. The light exit surface of the second camera 331 faces the first camera module 31, and the light exit surface of the light guide component 332 is arranged parallel to the light exit surface of the first camera module 31. The base 312 of the first camera module 31 abuts against the second camera module 33. For example, the base 312 of the first camera module 31 and the frame 333 of the second camera module 33 are jointed at the bottom of the terminal by glue.

The terminal of the embodiment of the present disclosure changes the arrangement of the flexible printed circuit of the camera module. The flexible printed circuit extends along the arrangement direction of the first camera module and the second camera module to electrically connect to the circuit board, reducing the arrangement space occupied by the camera module on the circuit board of the terminal and reducing the difficulty in the arrangement of the camera module.

The camera module and the terminal provided in the embodiments of the present disclosure are introduced in detail above. Specific embodiments are used for illustrating principles and implementation manners of the present disclosure. The above descriptions of the embodiments are merely for understanding the method and core ideas of the present disclosure. At the same time, a person skilled in the art may make modifications to the specific implementation manners and application ranges according to the idea of the present disclosure. In conclusion, the content of the specification shall not be regarded as a limitation to the present disclosure.

What is claimed is:

1. A camera module, comprising:
a first camera module;
a first flexible printed circuit connected to the first camera module;
a second camera module arranged side by side with the first camera module; and
a second flexible printed circuit connected to the second camera module, wherein at least one of the first flexible printed circuit and the second flexible printed circuit extends along an arrangement direction of the first camera module and the second camera module; wherein the second camera module comprises a second camera, a light guide component, and a frame, the frame accommodates and fixes the second camera and the light guide component, and the first camera module is external to the frame, and the light guide component is disposed between the first camera module and the second camera.

2. The camera module as claimed in claim 1, wherein the first camera module comprises a first camera and a base supporting the first camera, the base abuts the second camera module, and the first camera and the second camera module are arranged at intervals.

3. The camera module as claimed in claim 2, wherein the camera module is disposed in a housing of a terminal, and the base abuts the second camera module comprises: the base of the first camera module and the frame of the second camera module are jointed at a bottom of the terminal by glue.

4. The camera module as claimed in claim 1, wherein the first flexible printed circuit is connected to the first camera, and the second flexible printed circuit is connected to the second camera.

5. The camera module as claimed in claim 4, further comprising a third flexible printed circuit connected to the light guide component.

6. The camera module as claimed in claim 5, wherein the third flexible printed circuit extends from a side wall of the light guide component parallel to the arrangement direction, the third flexible printed circuit is adjacent to a side wall of the second camera, and the third flexible printed circuit extends to exceed an end of the second camera module away from the first camera module.

7. The camera module as claimed in claim 1, further comprising a first connector and a second connector, wherein the first flexible printed circuit is in electrical connection with the first connector, and the second flexible printed circuit is in electrical connection with the second connector.

8. The camera module as claimed in claim 7, further comprising a third connector, wherein a third flexible printed circuit is in electrical connection with the third connector.

9. A terminal, comprising:
a housing;
a circuit board; and
a camera module disposed in the housing, the camera module comprising:
a first camera module;
a first flexible printed circuit connected to the first camera module;
a second camera module arranged side by side with the first camera module; and
a second flexible printed circuit connected to the second camera module, wherein at least one of the first flexible printed circuit and the second flexible printed circuit extends along an arrangement direction of the first camera module and the second camera module and is in electrical connection with the circuit board; wherein the second camera module comprises a second camera, a light guide component, and a frame, the frame accommodates and fixes the second camera and the light guide component, and the first camera module is external to the frame, and the light guide component is disposed between the first camera module and the second camera.

10. The terminal as claimed in claim 9, wherein the first camera module comprises a first camera and a base supporting the first camera, the base abuts the second camera module, and the first camera and the second camera module are arranged at intervals.

11. The terminal as claimed in claim 10, wherein the base abuts the second camera module comprises: the base of the first camera module and the frame of the second camera module are jointed at a bottom of the terminal by glue.

12. The terminal as claimed in claim 9, wherein the first flexible printed circuit is connected to the first camera, and the second flexible printed circuit is connected to the second camera.

13. The terminal as claimed in claim 12, wherein the camera module further comprises a third flexible printed circuit connected to the light guide component.

14. The terminal as claimed in claim 13, wherein the third flexible printed circuit extends from a side wall of the light guide component parallel to the arrangement direction, the third flexible printed circuit is adjacent to a side wall of the second camera, and the third flexible printed circuit extends to exceed an end of the second camera module away from the first camera module.

15. The terminal as claimed in claim 9, the camera module further comprises a first connector and a second connector, wherein the first flexible printed circuit is in electrical connection with the first connector, and the second flexible printed circuit is in electrical connection with the second connector.

16. The terminal as claimed in claim 15, the camera module further comprises a third connector, wherein a third flexible printed circuit is in electrical connection with the third connector.

17. A terminal, comprising:
a housing;
a circuit board; and
a camera module disposed in the housing, the camera module comprising:
a first camera module;
a first flexible printed circuit connected to the first camera module;
a second camera module arranged side by side with the first camera module; and
a second flexible printed circuit connected to the second camera module, wherein at least one of the first flexible printed circuit and the second flexible printed circuit extends along an arrangement direction of the first camera module and the second camera module and is in electrical connection with the circuit board; wherein the first camera module comprises a first camera and a base supporting the first camera, the base abuts the second camera module, and the first camera and the second camera module are arranged at intervals; wherein the second camera module comprises a second camera, a light guide component, and a frame, the frame accommodates and fixes the second camera and the light guide component, and the light guide component is disposed between the first camera module and the second camera; wherein the first flexible printed circuit is connected to the first camera, and the second flexible printed circuit is connected to the second camera;

a third flexible printed circuit connected to the light guide component; wherein the third flexible printed circuit extends from a side wall of the light guide component parallel to the arrangement direction, the third flexible printed circuit is adjacent to a side wall of the second camera, and the third flexible printed circuit extends to exceed an end of the second camera module away from the first camera module.

18. The terminal as claimed in claim 17, the camera module further comprises a first connector and a second connector, wherein the first flexible printed circuit is in electrical connection with the first connector, and the second flexible printed circuit is in electrical connection with the second connector.

19. The terminal as claimed in claim 18, the camera module further comprises a third connector, wherein the third flexible printed circuit is in electrical connection with the third connector.

20. The terminal as claimed in claim 17, wherein the base abuts the second camera module comprises: the base of the first camera module and the frame of the second camera module are jointed at a bottom of the terminal by glue.

* * * * *